(12) United States Patent
Chang et al.

(10) Patent No.: US 7,616,722 B2
(45) Date of Patent: Nov. 10, 2009

(54) METHOD AND CIRCUITRY FOR EXTRACTING CLOCK IN CLOCK DATA RECOVERY SYSTEM

(75) Inventors: Chi Chang, Hsin-Tien (TW); Shuyu Lin, Hsin-Tien (TW)

(73) Assignee: VIA Technologies, Inc., Taipei Hsien (TW)

( * ) Notice: Subject to any disclaimer, the term of this patent is extended or adjusted under 35 U.S.C. 154(b) by 597 days.

(21) Appl. No.: 11/148,852

(22) Filed: Jun. 8, 2005

(65) Prior Publication Data

US 2006/0188047 A1    Aug. 24, 2006

(30) Foreign Application Priority Data

Feb. 24, 2005    (TW) ............................... 94105559 A

(51) Int. Cl.
*H04L 7/00* (2006.01)
(52) U.S. Cl. .................. 375/355; 375/360; 375/363; 375/367
(58) Field of Classification Search ................ 375/355, 375/360, 363, 367
See application file for complete search history.

(56) References Cited

U.S. PATENT DOCUMENTS

| | | | | |
|---|---|---|---|---|
| 6,539,051 B1* | 3/2003 | Grivna | ........................ | 375/219 |
| 6,545,507 B1* | 4/2003 | Goller | ........................ | 326/93 |
| 7,020,227 B1* | 3/2006 | Wang et al. | .................. | 375/355 |
| 7,265,690 B2* | 9/2007 | Vining | .......................... | 341/68 |
| 2002/0157062 A1* | 10/2002 | Greiner | ...................... | 714/801 |
| 2004/0165679 A1* | 8/2004 | Kwak | .......................... | 375/316 |
| 2004/0190667 A1* | 9/2004 | Matsuura | ..................... | 375/360 |
| 2005/0071713 A1* | 3/2005 | Vining | ......................... | 714/700 |
| 2006/0034394 A1* | 2/2006 | Popescu et al. | ............. | 375/326 |
| 2006/0050828 A1* | 3/2006 | Otomo et al. | ............... | 375/375 |

* cited by examiner

*Primary Examiner*—Shuwang Liu
*Assistant Examiner*—Kenneth Lam
(74) *Attorney, Agent, or Firm*—J.C. Patents

(57) ABSTRACT

A method for extracting a clock in a clock data recovery system is provided. The method includes the following steps. First, a serial link transmission data is sampled for a plurality of times, and a plurality of pulse signals are generated and sequentially arranged. Then, a mark is inserted after all pulse signals are generated and had been delayed for a predetermined delay time. The predetermined delay time is less than a period between two adjacent pulse signals, and a period between two adjacent pulse signals is divided into two sub-periods by the predetermined delay time. Then, it is checked whether the data status in each sub-period is changed or not, and this operation is repeated for a predetermined number of times. Finally, the clock is extracted when a pulse signal of no data status change within the predetermined number of times is being generated.

3 Claims, 9 Drawing Sheets

| R0 | R1 | R2 | R3 | R4 | R5 | S0 | S1 | S2 |
|----|----|----|----|----|----|----|----|----|
| 0  | 1  | 1  | 1  | 1  | 1  | 1  | 0  | 0  |
| 1  | 0  | 1  | 1  | 1  | 1  | 0  | 1  | 0  |
| 1  | 1  | 0  | 1  | 1  | 1  | 0  | 1  | 0  |
| 1  | 1  | 1  | 0  | 1  | 1  | 0  | 0  | 1  |
| 1  | 1  | 1  | 1  | 0  | 1  | 0  | 0  | 1  |
| 1  | 1  | 1  | 1  | 1  | 0  | 1  | 0  | 0  |

FIG. 8

METHOD AND CIRCUITRY FOR EXTRACTING CLOCK IN CLOCK DATA RECOVERY SYSTEM

CROSS-REFERENCE TO RELATED APPLICATION

This application claims the priority benefit of Taiwan application serial no. 94105559, filed on Feb. 24, 2005. All disclosure of the Taiwan application is incorporated herein by reference.

BACKGROUND OF THE INVENTION

1. Field of the Invention

The present invention relates to a method for extracting a clock, and more particularly, to a method for extracting a clock in a clock data recovery (CDR) system.

2. Description of the Related Art

Serial link is one of the important techniques to provide high transmission rate in high speed I/O. When data is transmitted with serial link, the clock data is not accompanied. In order to obtain accurate clock data, a clock data recovery system is commonly used to extract accurate clock data from the transmission data.

Among various methods for implementing the clock data recovery system, one is by using a Phase Locked Loop (PLL) circuitry to generate a clock signal, so as to perform phase tracking. The alternative method is by using an over-sampling technique to select an accurate data group.

FIG. 1 schematically shows a relationship between clock and data. Referring to FIG. 1, a point 11 in the diagram indicates a change in the data status. If the data is accessed on the point 11 (i.e. the data is accessed on the falling edge of the clock), data reading error is likely to occur. Accordingly, in order to extract an accurate clock data, the clock should be extracted in a position with no change in the data status.

FIG. 2A schematically shows a conventional method for extracting clock data. Please refer to FIG. 2A, it is assumed that 3×sampling is performed in FIG. 2A, or the sampling is performed for three times on one bit data. Therefore, three pulse signals S0, S1, and S2 appear during the sampling period, and the sampling period is divided into three periods G0, G1, and G2 by three pulse signals S0, S1, and S2. The area M1 surrounded by dotted line in FIG. 2A represents a period with data status change. It is known from FIG. 2A that since the maximum value of the area M1 (corresponding to the point 11 in FIG. 1) is within the period G1, when the pulse signals S1 and S2 are being generated, data status would have a lot of changes. Therefore, it is determined that the accurate clock data cannot be extracted when the pulse signals S1 and S2 are being generated. In other words, the clock data is extracted only when the pulse signal S0 is being generated.

However, since the data transmission patterns are irregular, and the amount of the sampling points is insufficient, the inaccurate extraction of the clock data is inevitably increased.

FIG. 2B schematically shows a case of extracting clock data in a conventional technique. Referring to FIG. 2B, it is apparent that the maximum value of the dotted-line area M2 is within the period G0. Therefore, based on the description above, the clock data is extracted when the pulse signal S2 is being generated. However, it is also observed that some data status change may still occur when the pulse signals S1 and S2 are being generated, and no data status change is observed when the pulse signal S0 is being generated. Accordingly, the clock data extracted on the pulse signal S2 is inaccurate, and the accurate clock data should be extracted only when the pulse signal S0 is being generated.

In order to resolve the problem mentioned above, other technique of extracting clock data had been developed. FIG. 3 schematically shows another conventional method for extracting clock data. Referring to FIG. 3, in such a conventional technique, when to extract the clock data is determined based on the accumulated information. Specifically, since the dotted-line area M3 may be drifted horizontally along with the jitter caused by the DC (low frequency) signal. Therefore, this conventional technique determines how many pulse signals occur in the dotted-line area M3 within a predetermined period of time Ts. When the number of the pulse signals occurring in the dotted-line area M3 exceeds a predetermined value during the predetermined period of time Ts, a pulse signal next to the originally selected one is selected. For example, as shown in FIG. 3, originally there is only one pulse signal S1 occurring in the dotted-line area M3, thus the clock data is extracted when the next pulse signal S2 is being generated. If the dotted-line area M3 had drifted horizontally to the dotted-line area M3' and contains the pulse signal S2 due to the impact of the DC signal (in other words, there are two pulse signals (S1 and S2) in the dot-line area M3'), the originally selected pulse signal S2 is replaced by the pulse signal S0 for extracting the clock data, thus the extraction error shown in FIG. 2B is overcome.

In the conventional technique of extracting clock data mentioned above, the tolerance of jitter margin caused by the DC signal is represented as follows:

$$2 \times \left( \frac{Tui}{3} - Ts - Tmismatch - Tphase \right) \quad (1)$$

where Tui represents a whole sampling period, Ts represents an area required for at least one change, Tui is divided by 3 to indicate that each bit is sampled three times; Tmismatch represents a time difference caused by the random jitter and the inconsistency of two different phases, and Tphase represents a time difference due to the noise. In addition, the reason for multiplying equation (1) by 2 is because the dotted-line area M3 drifts right or left, and the total tolerance of jitter margin for the whole system should be two times of it.

It is known from equation (1) that accumulating sufficient sampling points is required for accurately determining the time point of extracting the clock data, which inevitably increases the manufacturing cost and system complexity. Accordingly, when the number of the sampling points is getting bigger (i.e. the value of N is getting higher), the jitter margin of whole system is decreased, thus deteriorating the system accuracy and reliability.

SUMMARY OF THE INVENTION

Therefore, it is an object of the present invention to provide a method for extracting a clock in a clock data recovery system in order to reduce the system cost and complexity.

It is another object of the present invention to provide a method for extracting a clock in a clock data recovery system in order to provide a higher jitter margin.

It is yet another object of the present invention to provide a circuitry for extracting a clock in a clock data recovery system in order to determine a timing for extracting the clock data.

According to another aspect of the present invention, a method for extracting a clock in a clock data recovery system is provided by the present invention. The method comprises the following steps. First, a plurality of sampling are performed on a serial link transmission data, and a plurality of pulse signals are generated and sequentially arranged. Then, a mark is inserted after one pulse signal is generated for a predetermined delay time. Wherein, the predetermined delay time is less than a period between two adjacent pulse signals, and a period between two adjacent pulse signals is divided into two sub-periods by the predetermined delay time. Then, it is checked whether the data status in each sub-period is changed or not, and this operation is repeated for a predetermined number of times. Finally, when the pulse signal corresponding to the sub-period with no data status change within a predetermined number of times is generated, the clock is extracted.

According to another aspect of the present invention, a circuitry for extracting a clock in a clock data recovery system is provided by the present invention. The circuitry for extracting a clock is suitable for processing a sampling of a transmission data. The sampling in the transmission data comprises a plurality of pulse signals corresponding to a plurality of signal periods in the transmission data, and a mark is inserted between two adjacent pulse signals among these pulse signals, such that a sampling period is divided into a plurality of sub-periods. The present invention further comprises a plurality of XOR gates, which are correspondingly coupled to a plurality of shift register modules, respectively. Wherein, the XOR gate compares the status of two sub-periods and generates an XOR operation result. Each shift register module comprises a plurality of status output terminals for outputting the XOR operation result received in different time. In addition, the present invention further comprises a plurality of OR gates correspondingly coupled to the shift register modules mentioned above respectively for receiving the signal output from the status output terminal of each shift register module.

Each shift register module comprises a plurality of registers, which are coupled with each other in serial. Each register transmits a register value to a next register based on a clock signal, and the output of each register is coupled to a status output terminal of the shift register module, respectively. In addition, an input of a first register is coupled to an output of a corresponding XOR gate and to a first status output terminal of the shift register module. In the present embodiment, each register comprises a D Flip-flop.

In summary, the present invention has at least the following advantages:

1. The present invention monitors a sub-period with no data status change within a predetermined number of times in order to extract accurate clock data. Therefore, the present invention has a higher jitter margin, which is represented as:

$$2 \times \left( \frac{Tur}{N} - Tmismatch - Tphase \right) \quad (2)$$

Please refer to equation (1) for what each term stands for, and N is a positive integer representing the number of sampling each bit.

2. The present invention accurately determines the pulse signal for extracting the clock data without having to increase the number of sampling. Accordingly, the present invention improves the system accuracy and reliability without adding the system cost and complexity.

3. The present invention is composed of simple logic gates, thus the complexity of design is further reduced.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 8 schematically shows a mapping table for selecting the pulse signal based on the output of the OR gate according to an embodiment of the present invention.

DESCRIPTION OF THE EMBODIMENTS

Figure 1:
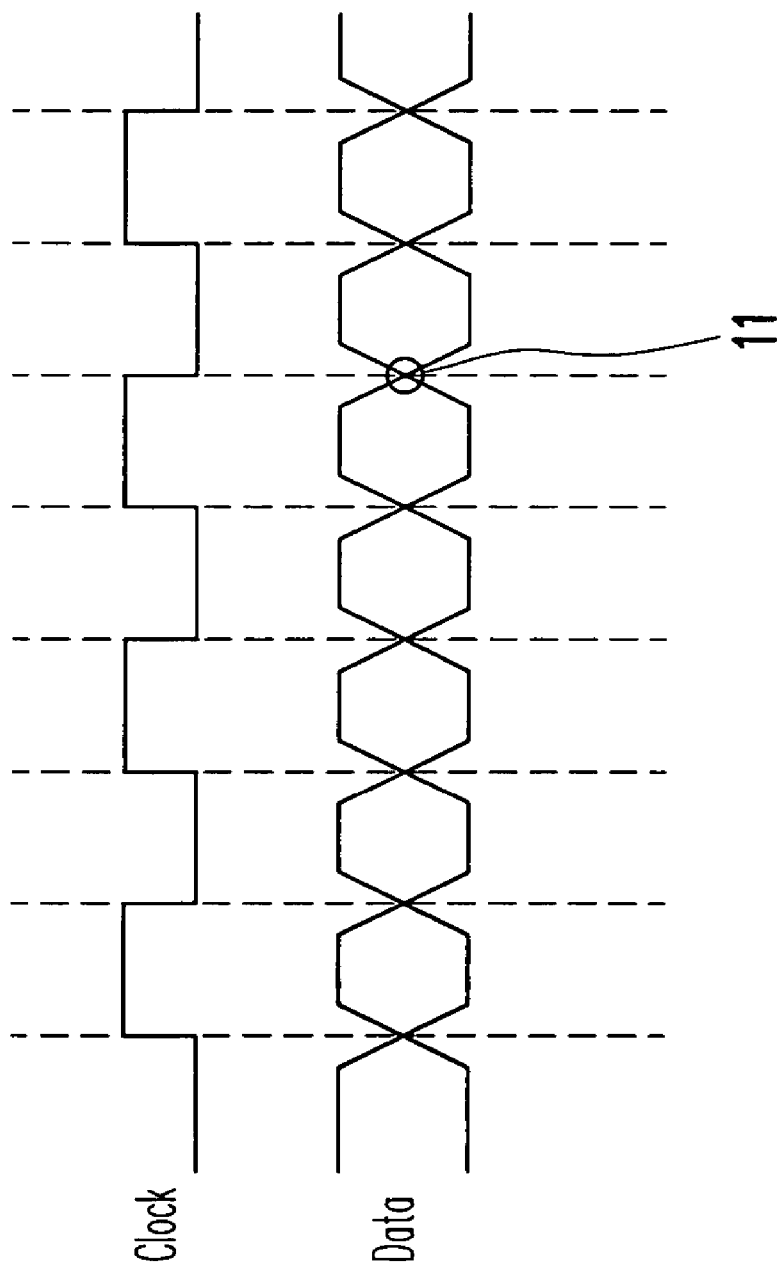
FIG. 1 schematically shows a relationship between clock and data.
Figure 2A:
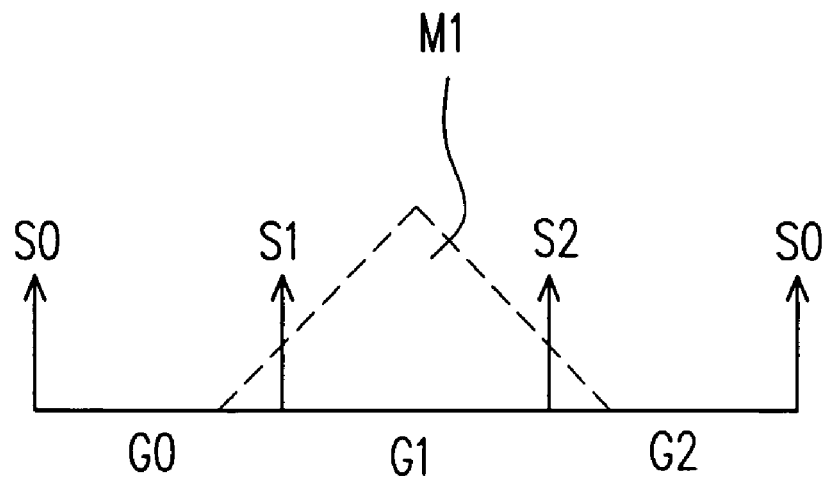
FIG. 2A schematically shows a conventional method for extracting clock data.
Figure 2B:
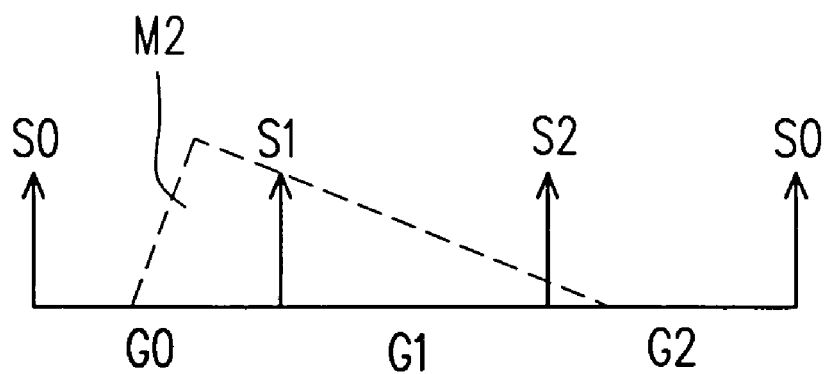
FIG. 2B schematically shows a case of extracting clock data by using a conventional technique.
Figure 3:
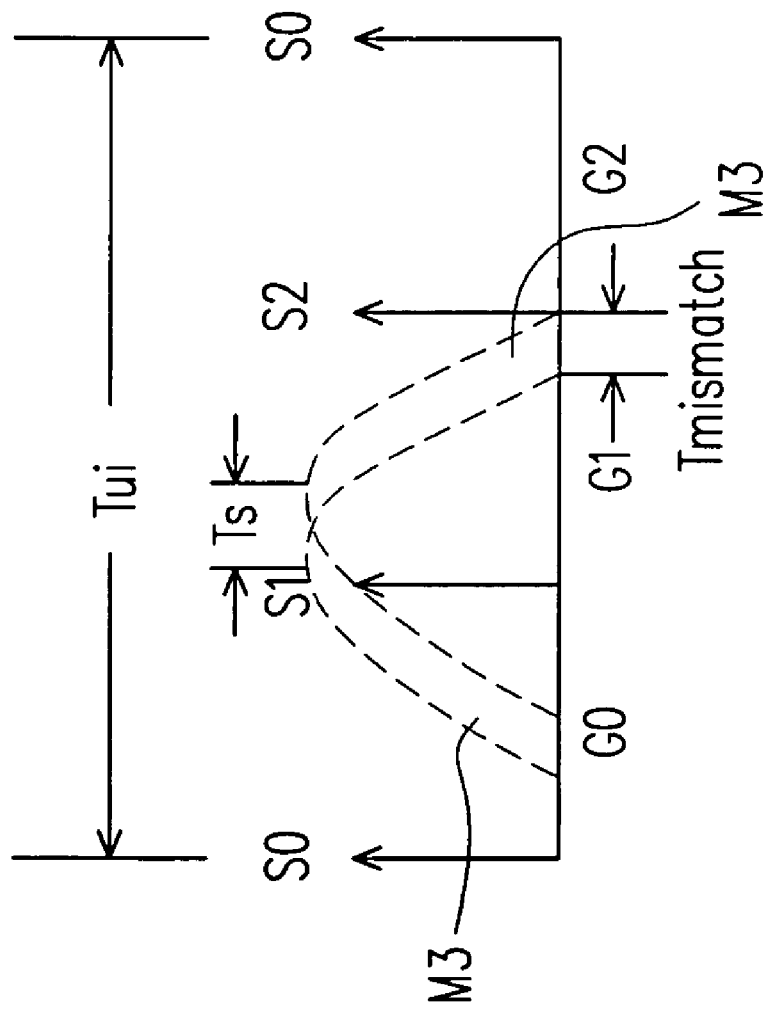
FIG. 3 schematically shows another conventional method for extracting clock data.
Figure 4:
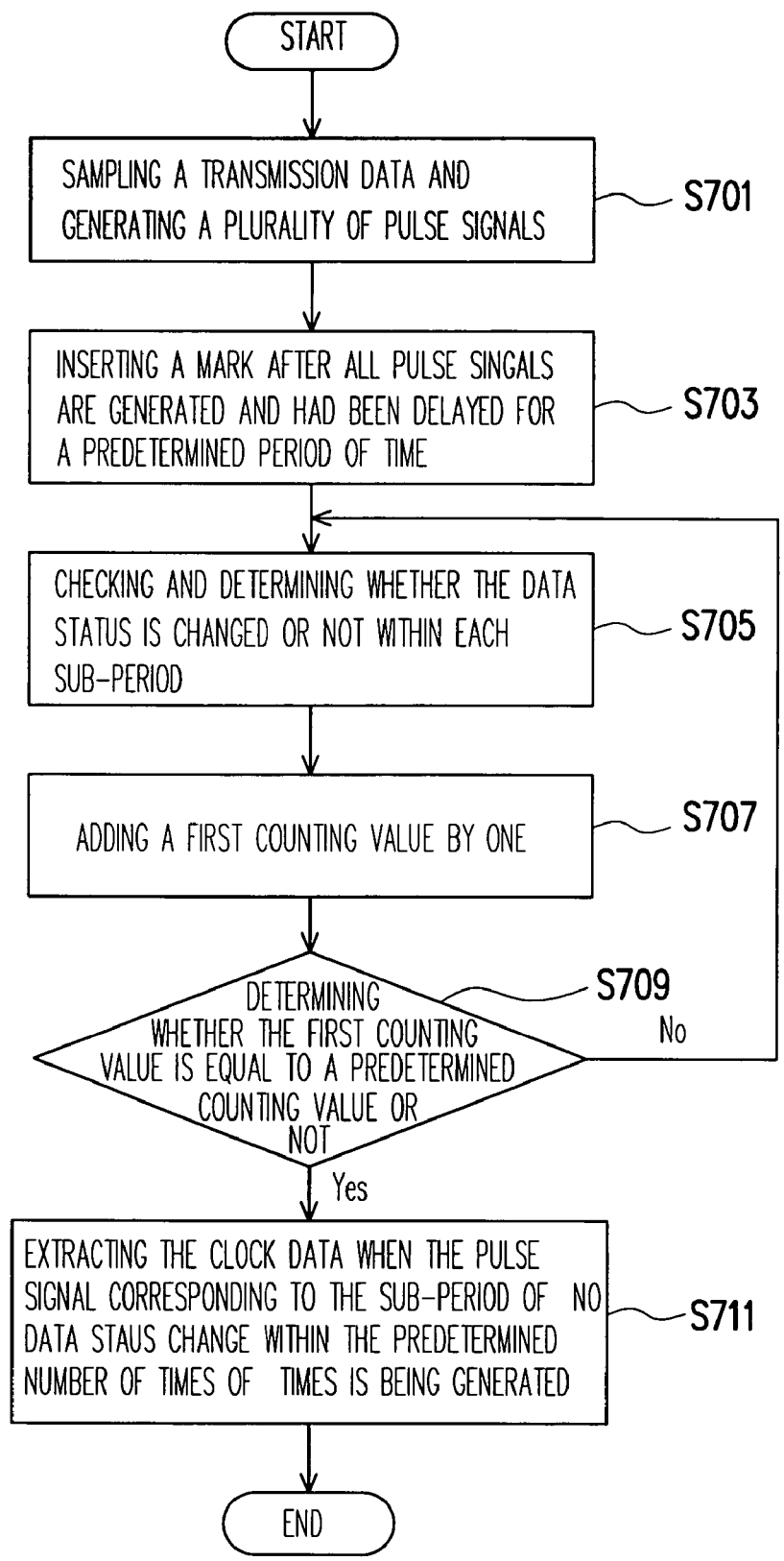
FIG. 4 schematically shows a flow chart illustrating a method for extracting clock in a clock data recovery system according to another embodiment of the present invention.
Figure 5:
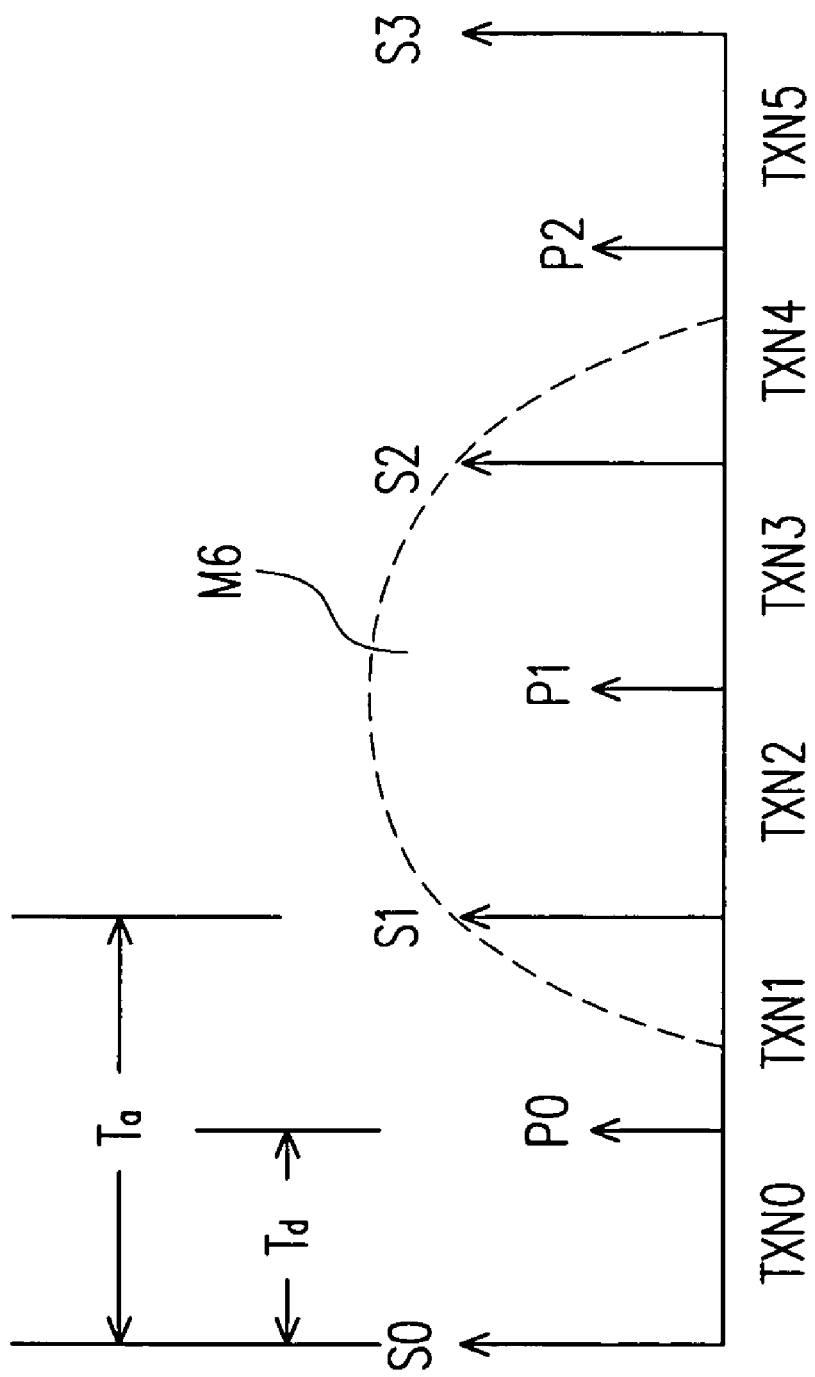
FIG. 5 schematically shows a method for extracting clock in a clock data recovery system according to another embodiment of the present invention.

FIG. 4 schematically shows a flow chart illustrating a method for extracting clock in a clock data recovery system according to an embodiment of the present invention. FIG. 5 schematically shows a method for extracting clock in a clock data recovery system according to an embodiment of the present invention. Referring to both FIGS. 4 and 5, in the present embodiment, first in step S701, a transmission data is sampled and a plurality of pulse signals are generated (such as S0, S1, and S2 in FIG. 5). Then, in step S703, a plurality of marks (i.e. P0, P1, and P2 in FIG. 5) are inserted after all pulse signals are generated and had been delayed for a predetermined period of time $T_d$. Wherein, the marks P0, P1, and P2 are referred to as the Pseudo Pulse Signals, and the Pseudo Pulse Signals P0, P1, and P2, which have no physical impact on the signal process, are used as marks for dividing a whole sampling period into a plurality of sub-periods TXN0, TXN1, TXN2, TXN3, TXN4, and TXN5. Under an optimal operating status of the present embodiment, the predetermined time $T_d$ mentioned above is about half amount of $T_a$, which is a period between two adjacent pulse signals.

After the marks are inserted between the adjacent pulse signals, in step S705, it is determined whether the data status is changed or not within each sub-period. Then, in step S707, a first counting value is added by one. Then, in step S709, it is determined whether the first counting value is equal to a predetermined counting value or not. Since in the step S705, sampling is only performed once, the data reading error may occur. For example, TXN0=0, TXN1=1, TXN2=0, TXN3~TXN5=1 are obtained, thus it is hard to determine whether to choose S0 or S1. Therefore, by repeatedly performing steps 707 and 709 for a couple of times to determine whether the counting value is equal to the predetermined number or not, a rather normal Gauss distribution (such as M6 in FIG. 5) is obtained from multiple samplings, such that the dual-peak or unbalanced distribution can be avoided. If the first counting value is not equal to the predetermined counting value yet (i.e. "No" indicated in step S709), the step S705 is repeated. On the other hand, if the first counting value is equal to the predetermined counting value (i.e. "Yes" indicated in step S709), then in step S711, the data is extracted when the pulse signal corresponding to the sub-period with no data status change within the repeated operations for the predetermined number of times is being generated. As shown in FIG. 5, there is no data status change within the sub-period TXN0, thus the pulse signal S0 is selected as an appropriate timing for extracting data. Since more sub-periods had been generated by reducing the periods with the Pseudo Pulse Signals P0, P1, and P2, the accurate timing for extracting clock data is determined after the relatively normal distribution is obtained by reducing the predetermined number of times to a minimum value, such that the accurate clock and data can be obtained.

Figure 6:
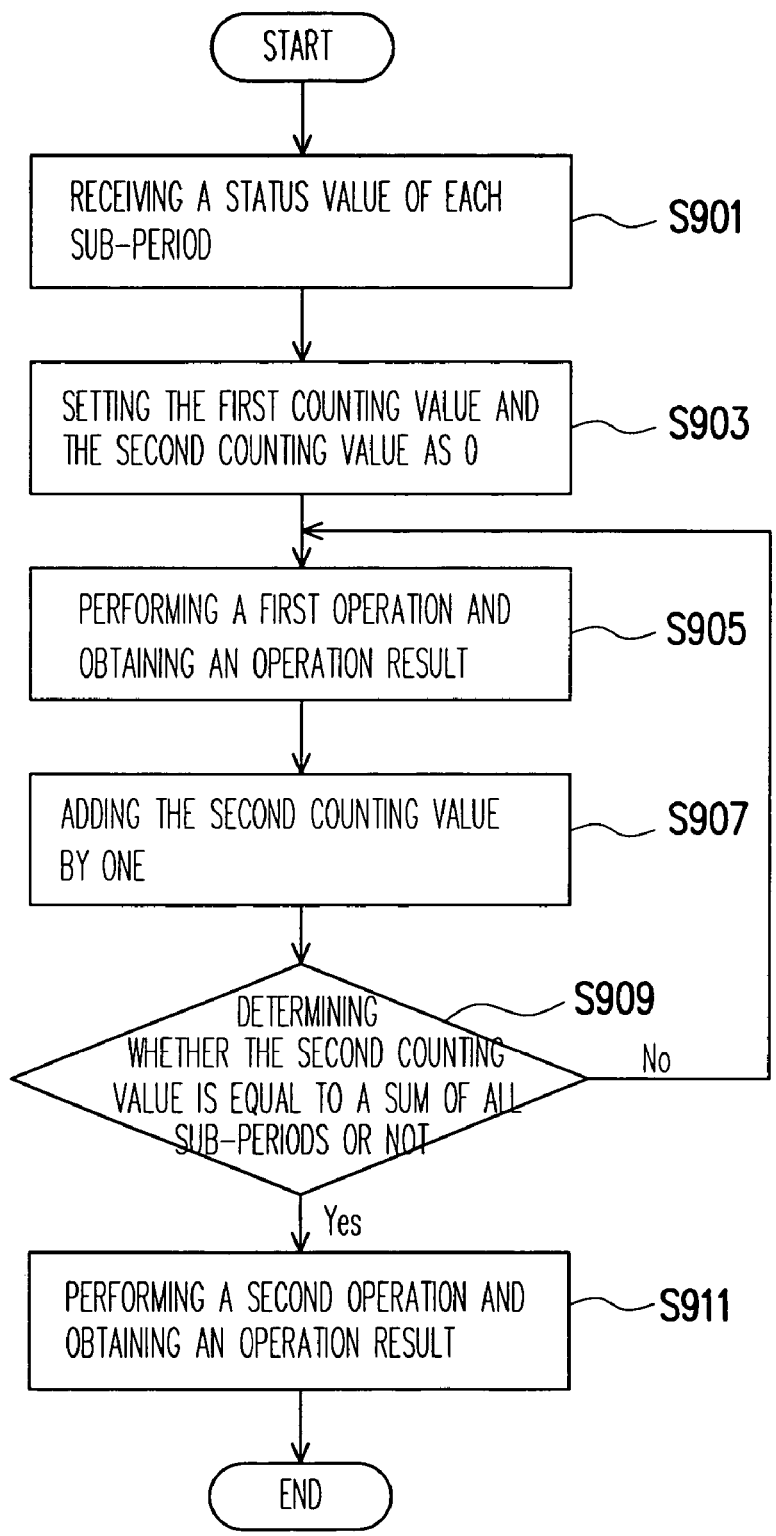
FIG. 6 schematically shows a flow chart illustrating a method for determining whether the data status within each sub-period is changed or not according to an embodiment of the present invention.

FIG. 6 schematically shows a flow chart illustrating a method for determining whether the data status within each sub-period is changed or not according to an embodiment of the present invention. FIG. 6 is the detail process in step S705 of FIG. 7. First, in step S901, a status value of each sub-period is received. Here, the status value of each sub-period is defined as $D_{ij}$. Wherein, the subscript i represents an $i^{th}$ sub-period. It is also assumed that there are 6 sub-periods in FIG. 5 of the present embodiment, thus i is an integer greater than or equal to 0 and less than or equal to 5. The subscript j represents a $j^{th}$ checking, that is, the first counting value mentioned above for comparing with the predetermined number of times (assuming it is m), thus j is an integer greater than or equal to 0 and less than or equal to m.

Then, in step S903, both i and j are set as 0. In the present embodiment, i is a second counting value. In step S905, a first operation is performed on $D_{ij}$ in order to obtain an $x^{th}$ operation result $R_x$, wherein the subscript x is an integer including 0, and the first operation is represented as follows:

$$\sum_{j=0}^{m} XOR\{D_{ij}, D_{i+1,j}\} = R_x \quad (2)$$

where x=i. Then, in step S907, the second counting value i is added by one. In step S909, it is determined whether the second counting value i is equal to a sum of all sub-periods or not (i.e. whether it is equal to 5 or not). In the present embodiment, if the second counting value i is not yet equal to 5 ("No" indicated in step S909), the step S905 is repeated. On the other hand, if the second counting value i is equal to 5 ("Yes" indicated in step S909), then in step S911, a second operation is performed on $D_{ij}$ in order to obtain the operation result $R_x$, and the second operation is represented as follows:

$$\sum_{j=0}^{m} XOR\{D_{nj}, D_{0j}\} = R_x \quad (3)$$

where in the present embodiment, the subscript n is equal to 5.

Figure 7A:
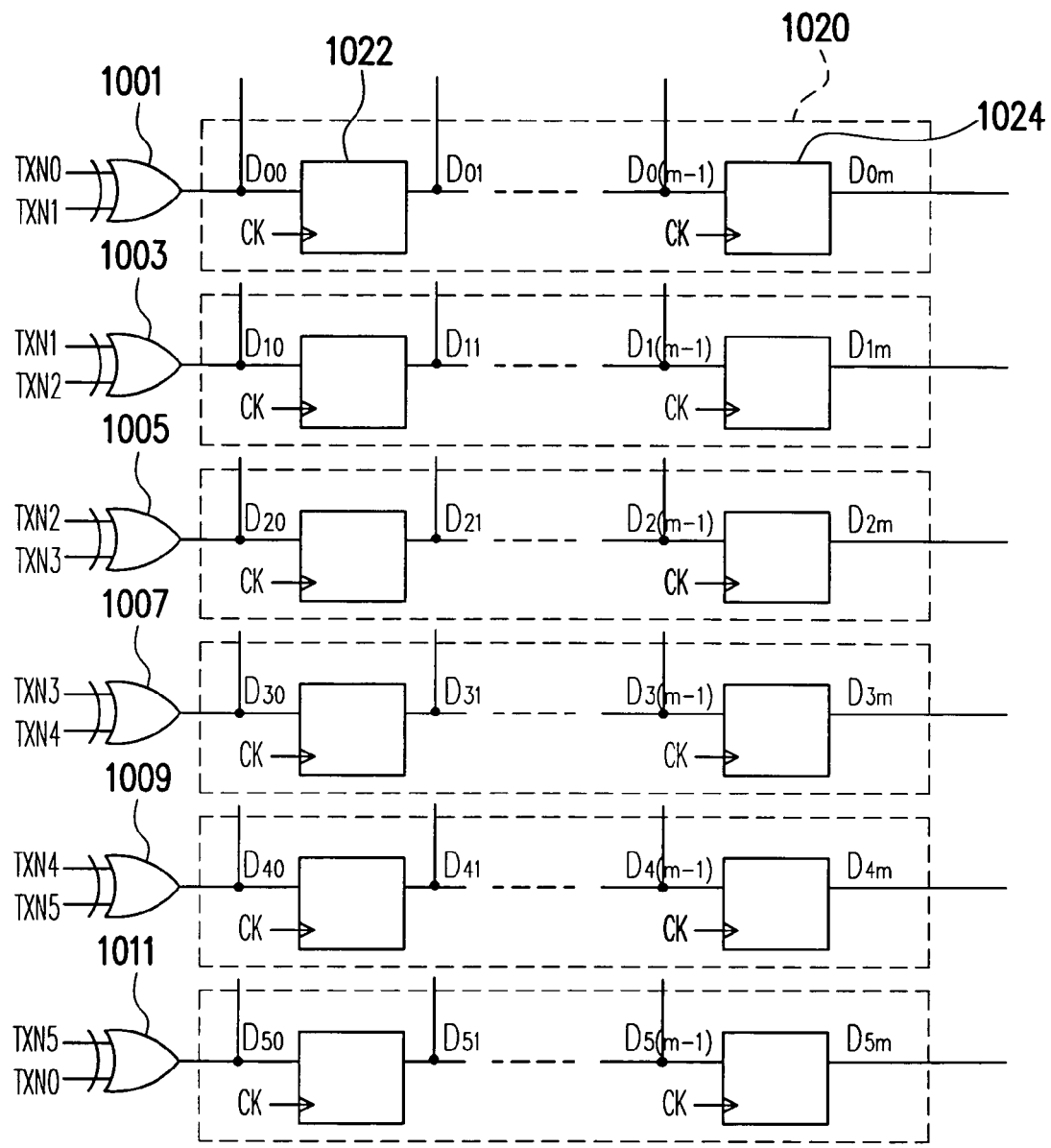
FIGS. 7A and 7B schematically show a configuration diagram of a circuitry for extracting clock in a clock data recovery system according to an embodiment of the present invention.
Figure 7B:
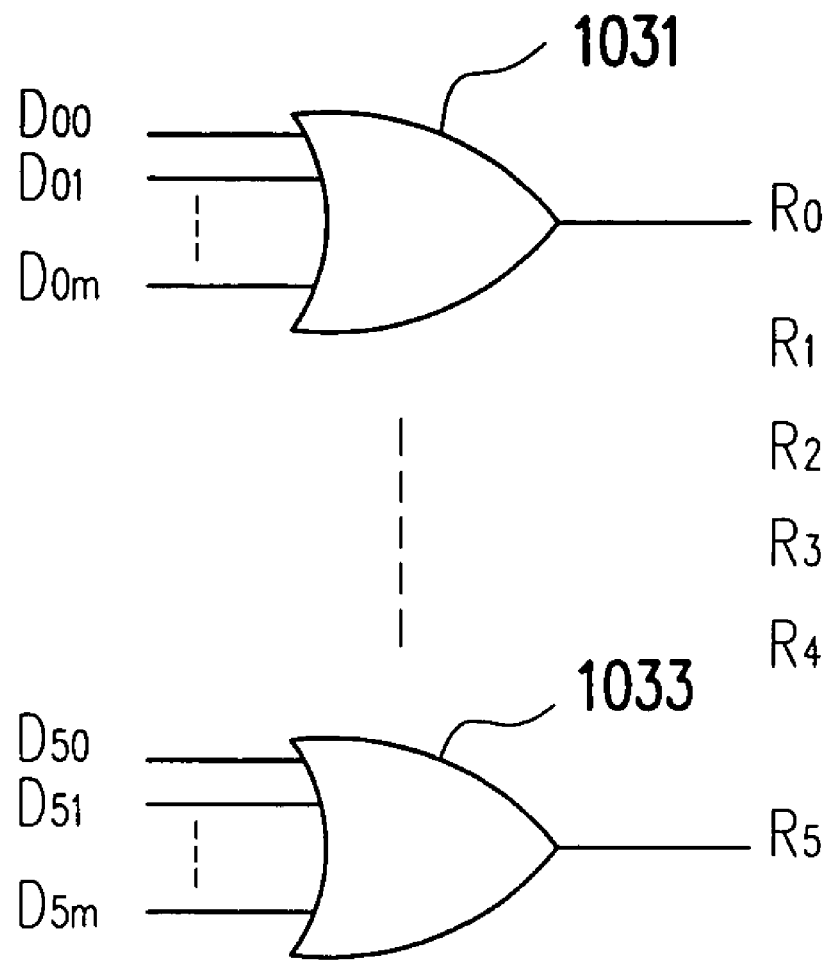

FIGS. 7A and 7B schematically show a configuration diagram of a circuitry for extracting a clock in a clock data recovery system according to an embodiment of the present invention. Referring to FIGS. 5, 6, 7A, and 7B, the circuitry disclosed in the present invention may be implemented by integrated circuits (IC) and designed with the method described in FIG. 5. As shown in FIG. 7A, the present invention comprises a plurality of XOR gates 1001, 1003, 1005, 1007, 1009, and 1011. The input of each XOR gate is coupled to a status signal of two adjacent sub-periods (represented by a combination of TXN0~TXN5 herein), and its output is coupled to a shift register module such as the shift register module 1020. Each shift register module comprises a plurality of status output terminals (e.g. $D_{00}$~$D_{0m}$). The circuitry for extracting a clock provided by the present invention further comprises a plurality of OR gates, such as the OR gates 1031 and 1033 in FIG. 7B. In the present embodiment, the output of the OR gate is the operation result $R_x$ of equations (2) and (3) mentioned above.

Same as the shift register module 1020, each shift register module comprises a plurality of registers (such as the registers 1022 and 1024), which are coupled with each other in serial. Each register transmits a register value to a next register based on a clock signal CK, and the output of each register is coupled to one of the status output terminals of the corresponding shift register module, respectively. Wherein, an input of a first register (such as the register 1022) is coupled to an output of the corresponding XOR gate (such as the XOR gate 1001), and also coupled to a first status output terminal (such as $D_{00}$) of the shift register module.

After the inputs of the XOR gates 1001, 1003, 1005, 1007, 1009, and 1011 are all coupled to the corresponding sub-period, an XOR operation is performed based on the clock signal CK. In other words, each time the clock signal CK changes its state, the XOR operation is performed on two adjacent sub-periods by the XOR gates 1001, 1003, 1005, 1007, 1009, and 1011, and an XOR operation result is generated and transmitted to the shift register module. The register inside the shift register module transmits the register value to a next register based on the clock signal CK, and from the output of the status output terminal to the input terminal of the corresponding OR gate. For example, the register inside the shift register module 1024 transmits the register value to the input terminal of the OR gate 1031 based on the clock signal CK. In the present embodiment, each register inside the shift register module may be implemented by a D-type Flip-flop. In addition, the number of the registers inside each shift register module is determined based on the predetermined number of times.

As shown in FIG. 5, the dotted-line area M6 covers the sub-period TXN1~TXN4. Therefore, as long as an XOR operation result is generated from the XOR gate coupled to the sub-periods mentioned above, at least one "1" should occur within the counting period of the first counting value mentioned above. For example, although one input of the XOR gate 1001 is coupled to the sub-period TXN0, the other input is coupled to the sub-period TXN1 within the dotted-line area M6. Therefore, at least one XOR operation result should be 1 within the counting period of the first counting value. In other words, at least one of the status output terminals $D_{00}$~$D_{0m}$ should be 1. Since the input terminal of the OR gate 1031 is coupled to the status output terminals $D_{00}$~$D_{0m}$, and based on the truth table of the OR gate, as long as one of the inputs is 1, the output $R_x$ of the OR gate is 1. Therefore, the output $R_1$ of the OR gate 1031 (the first operation result mentioned above) is 1.

On the other hand, two input terminals of the XOR gate 1011 are coupled to the sub-periods TXN0 and TXN5, respectively, which are not included in the dotted-line area M6. In other words, there is no data status change in the sub-periods TXN5 and TXN1 within the counting period of the first counting value. Therefore, within the counting period of the first counting value, all of the outputs from the XOR gate 1011 are 0. That is, all of the outputs from the status output terminals $D_{50}$~$D_{5m}$ are 0. Since the input of the OR gate 1033 is coupled to the status output terminals $D_{50}$~$D_{5m}$, its output $R_5$ is 0.

FIG. 8 schematically shows a mapping table for selecting the pulse signal based on the output of the OR gate according to an embodiment of the present invention. Referring to FIGS. 5 and 8, when the output from one of the OR gates (i.e. the operation result $R_x$) is 0, two conditions are provided by the present invention to select an appropriate pulse signal for extracting the accurate clock data. The first condition is when two adjacent sub-periods corresponding to the $x^{th}$ operation occur on two different sides of a same pulse signal respectively, the clock data is extracted when the pulse signal contained in two adjacent sub-periods corresponding to the $x^{th}$ calculation is being generated. For example, when the first operation result R1 is 0, since its corresponding sub-periods TXN1 and TXN2 occur in two different sides of the pulse signal S1, the clock data is extracted when the pulse signal S1 contained in the sub-periods TXN1 and TXN2 is being generated.

The second condition is described as follows: when two adjacent sub-periods corresponding to the $x^{th}$ operation do not occur on two sides of a same pulse signal, that is, two adjacent sub-periods occur between two adjacent pulse signals, the clock data is extracted when the $x/2^{th}$ pulse signal occurs. For example, when the second operation result $R_2$ (x=2) is 0, two adjacent sub-periods TXN2 and TXN3 occur between the pulse signals S1 and S2, thus suitable for the second condition. Since the value of x in the operation result $R_x$ is 2, the clock data is extracted when the $x/2^{th}$ pulse signal, or the pulse signal S1, is being generated.

The sampling having 6 sub-periods are only exemplary, and one of ordinary skill in the art should easily infer other situations.

In summary, by inserting one mark between two adjacent pulse signals, the present invention can extract accurate clock data without adding the sampling amount. Therefore, the present invention can accurately extract the clock data without adding the system complexity. In addition, since the present invention obtains the accurate pulse signal through the XOR operation for extracting the accurate clock data, the tolerance of jitter margin can be higher. Furthermore, based on the method for extracting clock provided by the present invention, a circuitry for extracting a clock is further provided that may be implemented by a simple logic circuitry, thus it is very easy to implement the present invention.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A circuitry for extracting a clock in a clock data recovery system suitable for processing a sampling of a transmission data, and the circuitry for extracting clock comprises:
    a plurality of XOR gates for comparing status of each of a plurality sub-periods and generating an XOR operation result, wherein the sampling of the transmission data comprises a plurality of pulse signals corresponding to a plurality of signal periods in the transmission data, and a mark is inserted between any two adjacent pulse signals in order to divide the signal period into the two sub-periods;
    a plurality of shift register modules correspondingly coupled to the XOR gates respectively, each of the shift register modules comprising a plurality of status output terminals for outputting the XOR operation result received in different time point; and
    a plurality of OR gates correspondingly coupled to the shift register modules for receiving the outputs from the status output terminals and continuously checking whether the signal of each sub-period is changed.

2. The circuitry for extracting a clock in the clock data recovery system of claim 1, wherein each of the shift register modules comprises a plurality of registers, which are coupled in serial, and each of the shift register transmits a register value to next shift register based on a clock signal, and the output of each register is correspondingly coupled to the status output terminal respectively.

3. The circuitry for extracting a clock in the clock data recovery system of claim 2, wherein each of the shift register is a D-type Flip-flop.

* * * * *